Aug. 20, 1963

G. STAVIS 3,101,471

RADIO DIRECTION INDICATOR

Filed Feb. 4, 1950

INVENTOR
GUS STAVIS

BY *R. P. Morris*

ATTORNEY

Fig. 3.

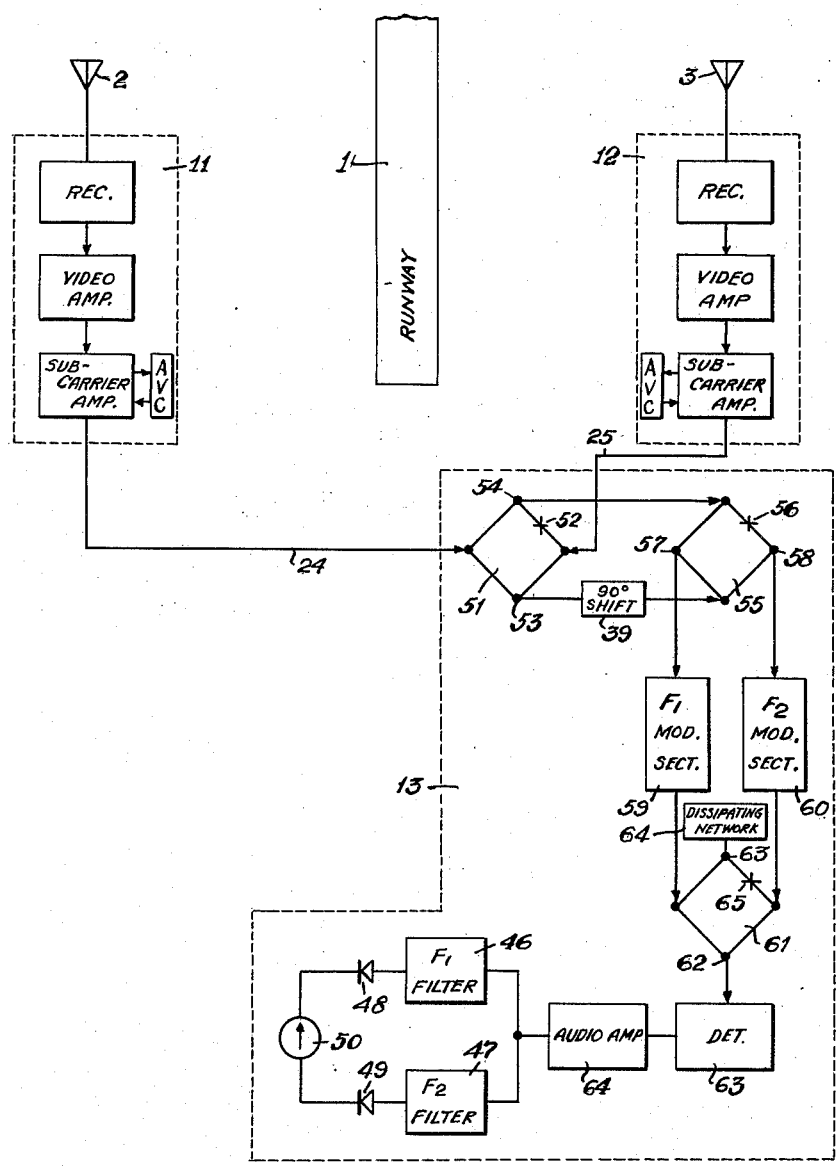

United States Patent Office 3,101,471
Patented Aug. 20, 1963

3,101,471
RADIO DIRECTION INDICATOR
Gus Stavis, Ossining, N.Y., assignor to International Standard Electric Corporation, New York, N.Y., a corporation of Delaware
Filed Feb. 4, 1950, Ser. No. 142,370
4 Claims. (Cl. 343—16)

This invention relates to radio direction indicators and more particularly to direction indicators for indicating the position of a craft relative to a fixed course line.

It is often desirable to indicate on the ground the position of a craft relative to a fixed course line, for the purpose of monitoring the craft position, control of traffic, directing the landing approach of aircraft or for other purposes. With such systems it is essential that the equipmen be arranged to provide a minimum of obstruction at an airport, for example. Also it is helpful if such a system may be made to operate without encumbering the craft with additional equipment.

Obstruction may be provided by having antennas spaced apart on opposite sides of a runway or course line. However, at the higher operating radio frequencies such a wide spacing results in an effective multi-lobe received pattern, which must be reduced in effective frequency so that an unambiguous indication is provided.

Systems have been proposed wherein the direction of a craft from which pulses of energy are transmitted, either directly or by repeating or reflection of pulses from a ground station, is obtained by comparing the timing of pulses received at spaced antennas. Such systems might be adapted for the monitoring of aircraft, but they require particularly broad band equipment and special types of indicators.

It is an object of the invention to provide a system for directional indication at a relatively fixed point, using spaced receiving antennas and a circuit for converting pulses into waves related to the antenna spacing which are then used to provide a directional indication.

According to a feature of this invention pulses from a craft are received on spaced antennas, and converted into separate waves having a frequency such that a half wave thereof is equal in length to at least the antenna spacing. These waves are combined in different phase to produce two output waves which are then differently modulated and from these modulated waves a directional indication is obtained.

More specifically the converted waves may be combined to obtain a vectorial sum and difference, one of these waves being shifted a further ninety degrees. The separate sum and difference waves are both modulated with separate indicating frequencies, one of these frequencies being reversed in phase at one modulator. One of the modulators is of the balanced type so that the carrier wave is suppressed, while the output of the other includes the carrier. The outputs of the modulators are then combined in a hydbrid network, this combined wave then being detected and the two modulating frequencies removed by filters. These removed modulating frequencies are then rectified and applied to a normal indicator such as used on aircraft.

While the general features of this invention have been described above a better understanding of these features and objects will be had from the particular description and embodiment thereof made with reference to the accompanying drawing in which:

FIG. 3 is a series of vector diagrams used in explaining the operation of the circuit of FIG. 2 and FIG. 4 is a diagram partially in block form illustrating embodiment of this invention.

Figure 1:
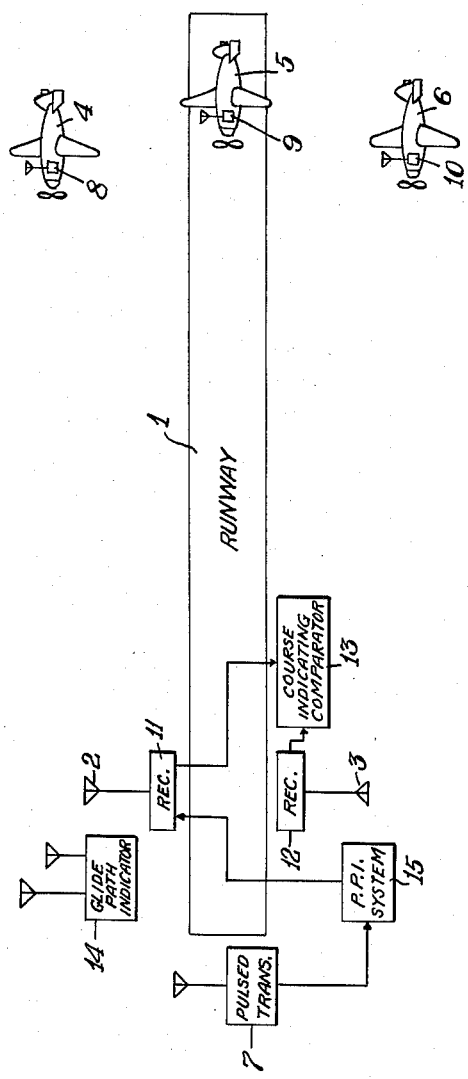
FIG. 1 is a schematic diagram illustrating the general principles of this invention.

Turning first to FIG. 1, there is shown a landing runway 1 near one end of which is provided a receiver circuit comprising a pair of spaced antennas 2 and 3 mounted on opposed sides of the run-way. Three airplanes are shown at 4, 5 and 6, the airplane 4 being to the left of the runway, airplane 5 directly on course and airplane 6 to the right of the run-way. Antennas 2 and 3 are arranged to receive pulse signals from any one of these airplanes. While the pulses might originate at the aircraft themselves, in the interest of maintaining a minimum of equipment on the plane the pulses may be transmitted from the ground station by pulse transmitter 7. These transmitted pulses may be returned from the aircraft to the receiving antennas either by reflection or by repeating transponders carried by the aircraft as indicated at 8, 9 and 10 respectively. The received pulses are processed in the separate receivers 11 and 12 and applied to a course indicating comparator shown generally at 13. Associated with the landing equipment may be provided a glide path signal receiver and indicator shown generally at 14. The outputs from indicators 13 and 14 may be combined if desired on a cross pointer type of instrument similar to that normally carried by the aircraft.

While it is not part of this invention the distance of the aircraft from the ground station may also be indicated by means of a plan position indicator system shown at 15. This indicator system may be coupled to one of the receivers, 11 for example. Such a system may be similar to radar or distance measuring display systems synchronized with the pulses transmitted from 7. It will be seen that this entire system will provide an arrangement for monitoring the aircraft on the ground so that an indication similar to that provided on each craft may be observed on the ground.

Figure 2:
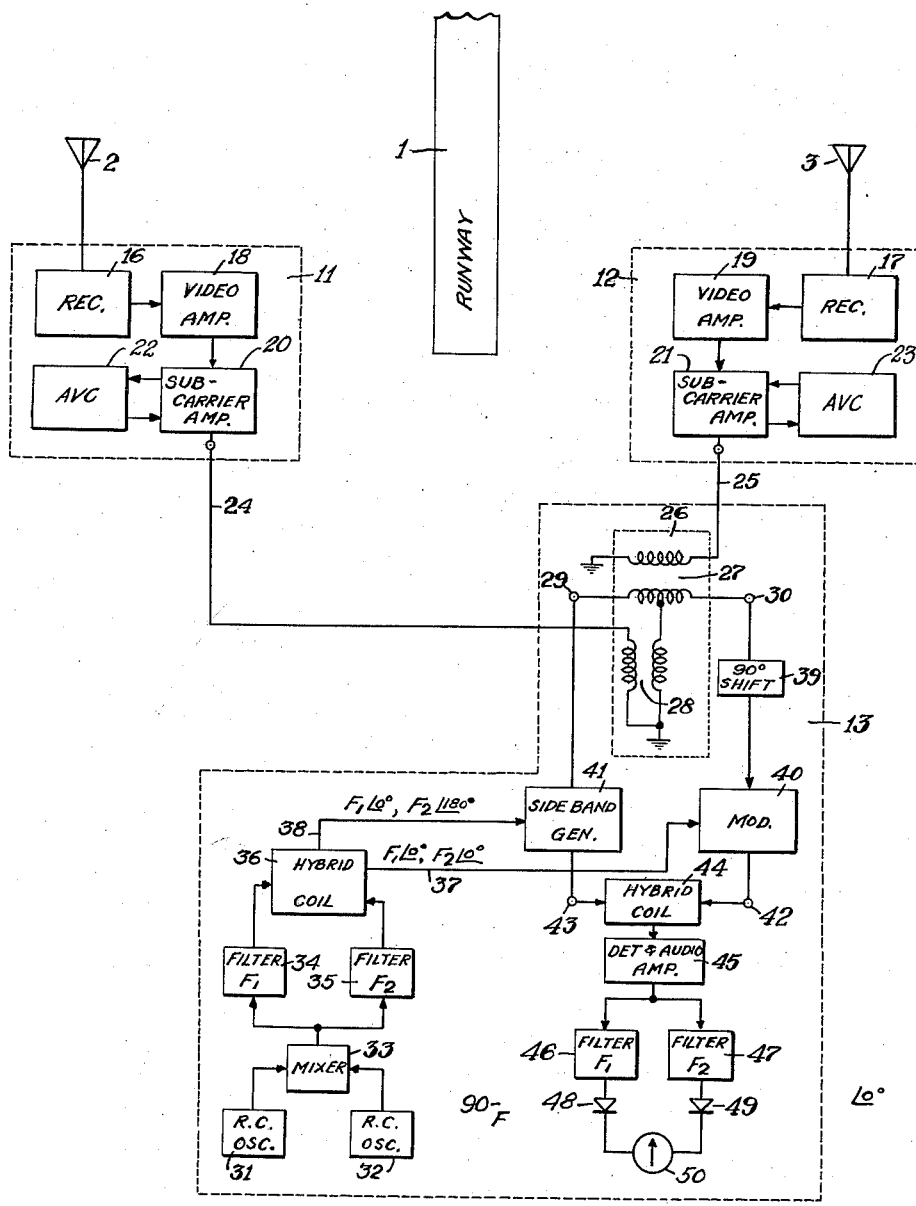
FIG. 2 is a schematic circuit diagram partly in block illustrating a receiver system incorporating the features of this invention.

Turning now to FIG. 2, a particular circuit arrangement which may be used in conjunction with antennas 2 and 3 is shown. It will be observed that antennas 2 and 3 are spaced apart on opposite sides of the run-way. At the normal frequencies used for instrument landing or at higher frequencies these antennas will thus be spaced apart a plurality of wave lengths. Thus the energy received in the two antennas if combined will produce a multi-lobe pattern which cannot be used to give a location without ambiguity. Pulses from the antenna are received on the separate antennas 2 and 3 and a circuit arrangement is provided for reducing the signals from the pulses to a wave energy of such a frequency that the antennas are spaced apart a distance equal to half wave length or less of this received energy. The phasing of the energy will, of course, be determined by the time difference at which the pulses are received at the two antennas. It will, therefore, be seen that if this energy is combined cophasally from the antenna and also anti-phasally effectively two patterns overlapping in space midway between the antennas will be produced. This energy then may be applied to the course indicating comparator circuit 13 to give an indication of direction.

As shown each of the receivers 11 and 12 comprises a first receiver arrangement 16, 17 which receives the radio frequency pulses and detects them to provide the envelope pulses. These envelope pulses are amplified in video amplifiers 18, 19 and applied respectively to the wave generators or sub-carrier amplifiers 20, 21. It will be understood that the pulses coming from the airplane are of such repetition rate and width as to favor the particular sub-carrier frequency to be selected. Each of the sub-carrier amplifiers 20, 21 is preferably provided with an automatic volume control indicated at 22, 23 respectively so that the output energy from these two generators is maintained substantially constant.

The output energy from sub-carrier amplifiers 20, 21 is applied over lines 24, 25 to the signal comparator circuit 13. This comparator circuit may include a bridge circuit 26 connected as a hybrid coil. The input energy over line 25 is applied over transformer 27 so that the energy will be in opposite phase at the terminals of the secondary thereof. The energy applied over line 24 is applied to transformer 28, the secondary of which is coupled between the mid-point of the secondary of transformer 27 to ground so that this energy will be cophasally applied to the output terminals 29, 30 of the secondary transformer 27. It will thus be seen that the energy will add at one of the terminals, 29 for example, and subtract at the other terminal 30 providing in effect output energy combined in different phases from the antennas 2 and 3.

For the purpose of providing an indication by means of instruments similar to those carried in the aircraft 2 indicating frequencies are generated. These may be generated by means of two simple resistance capacity oscillators 31 and 32, the outputs of which are combined in mixer 33 to produce the desired tone frequencies, of 90 and 150 cycles for example, which may be designated as F1 and F2. Filters 34 and 35 serve to separate these frequencies which may then be combined over a hybrid coil or other bridge network 36 to produce separate output tone frequencies. In output line 37 for example the frequencies may be designated as $F1 \angle 0$, $F2 \angle 0$ while on line 38 the energy may be $F1 \angle 0$, and $F2 \angle 180$.

Energy from terminal 30 may be applied over a further phase shifter 39 which produce an additional 90° phase shift to a modulator 40 together with the tone frequencies from line 37. Modulator 40 is of the normal type providing the carrier frequency plus the two side bands. The energy from terminal 29 is applied to side band generator or balanced modulator 41 to which are applied the tone frequencies from line 38 so that at its output there appears only the side band energy. Output energies from modulators 40 and 41 are applied over terminals 42, 43 to another hybrid coil or bridge circuit 44. It will be apparent that because of the phase difference of the sub-carrier frequencies caused by the difference in timing of the pulses the tone frequencies F1 and F2 will combine in the bridge circuit 44 so their amplitudes will be varied in accordance with the phase difference of the received pulses. The output from hybrid coil 44 is applied to a detector and audio amplifier 45 so that the different modulating tone frequency envelopes can be derived. The modulating tone frequencies from detector amplifier 45 are applied over respective filters 46, 47 and individual rectifiers 48, 49 to an indicating meter 50.

Figure 3:
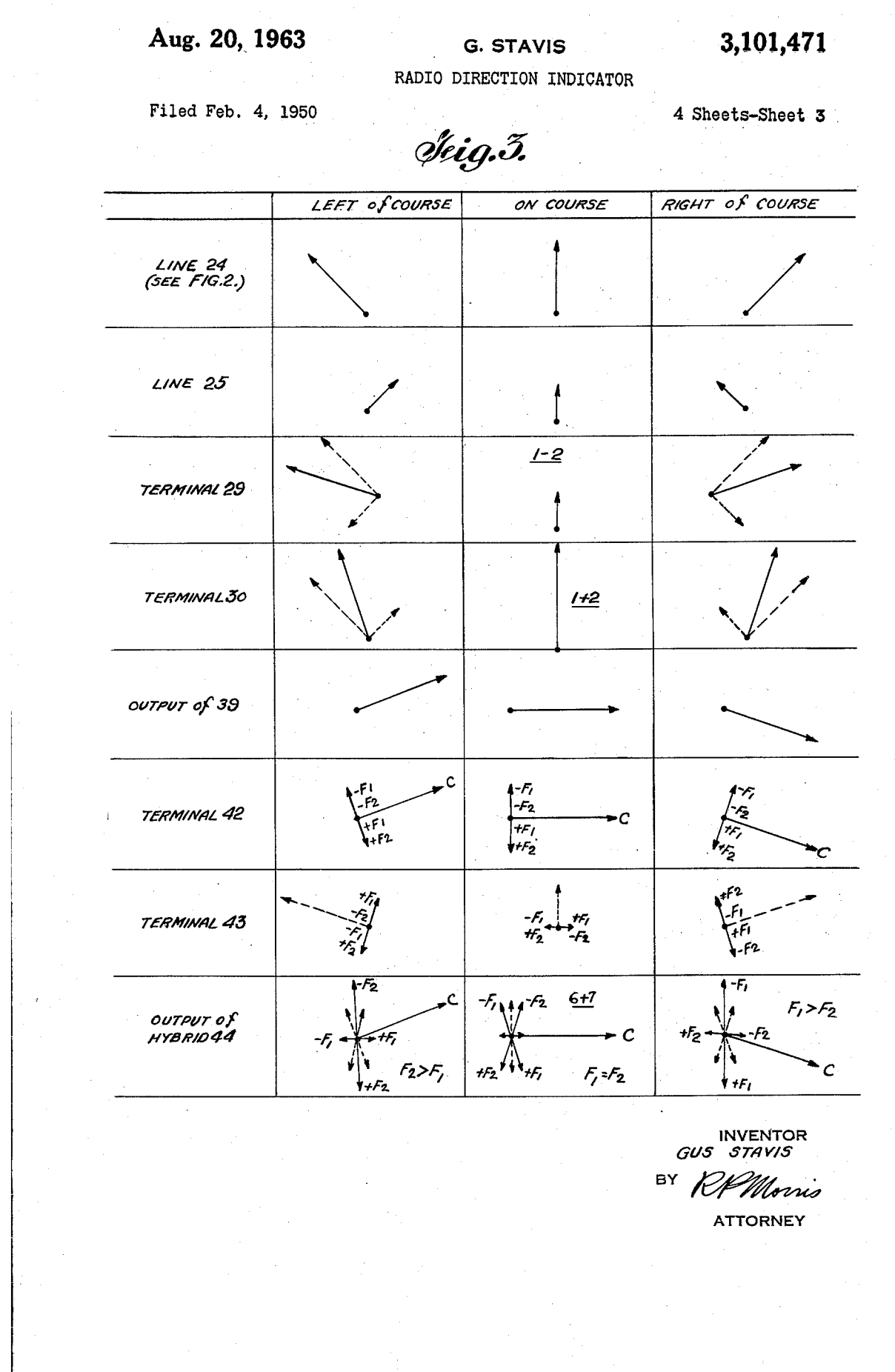

The analysis of the operation of this circuit can be best understood by reference to the vector diagrams shown in FIG. 3. Assuming the aircraft to be on course, the pulse which may be reflected will arrive at antennas 2 and 3 simultaneously so that the sub-carrier frequency appears in phase in lines 24 and 25. These need not be of the same magnitude although they preferably are but a ratio of 2–1 has been designated in the vector diagram to illustrate how the magnitude may vary. The output at the terminals 29 and 30 of the bridge are shown to be in phase. After modulating the resulting phase of the carrier and side band components at terminals 2 and 3 is shown. These are mixed and the resulting vector diagram for the output of the hybrid 44 shows equal amounts of amplitude and phase modulation of the tone frequencies F1 and F2. Although the detector will disregard the phase modulation it is of interest to notice that equal amounts do exist, if the energies are chosen to be equal then there is no phase modulation.

When the aircraft is at the left of the course the energy at the antenna 2 will lead that at antenna 3. The vector analysis shows that under these conditions the predominance of the F2 component will produce the desired off-course indication. The vector analysis for the aircraft to the right of the course shows a predominance of F1 modulation producing an off-course indication to the opposite side. Thus the normal localiser operation is obtained and the indication will be the same as that produced on an aircraft by a similar type of system.

It will be recognized that the only equipment necessary on the aircraft is at most a simple transponder which may be used with the normal type of distance measuring equipment. However, no equipment for the aircraft need be provided at all since the system will work on reflected pulses providing only that the receivers be sufficiently sensitive to respond to this reflected energy.

By making the transmitting antenna directive and sweeping it over a sector including the area to be monitored the display of the distance of the aircraft may also be provided if desired.

Turning now to FIG. 4, in this arrangement the antennas 2 and 3 and receivers 11 and 12 are the same as those shown in FIG. 2. However, the comparator circuit is of somewhat simpler form. The energy applied from lines 24, 25 is supplied to the transmission line bridge network 51 shown conventionally in single line diagram. In one arm of the bridge 51 is provided transposition 52. It will be seen that the energy over line 25 will be combined cophasally with the energy over line 24 at terminal 53 of the bridge and in phase opposition at terminal 54 resulting in two output energies corresponding to the sum and difference respectively of the energy from the receivers 11 and 12. These energies after one of them has been shifted in phase in shift 39 are applied in diagonally opposed terminals of a bridge network 55 similar to network 51. This bridge also has a transportation shown at 56. Thus these wave energies are added at a terminal 57 and subtracted at terminal 58. The output energy from these terminals is then modulated by modulators 59 and 60 respectively, which modulators may be of the mechanical or electronic type normally used in radio beacons. These modulated energies are then combined over a third bridge network 61 in additive relation so that at output terminal 62 their sum will appear. The diagonally opposed terminal 63 of the bridge is connected to a dissipating resistor 64. However, as the carrier energy is transposed at transposition 65 the amount of energy to be dissipated will be less than that at the output terminal. Energy from terminal 62 is applied to a detector 63 and an audio amplifier 64 and hence over filters 46, 47 and rectifiers 48 and 49 to the indicating meter 50.

While only two modifications of this invention have been disclosed it is clear that many changes may be made without departing from the scope thereof. In place of the various transmission line bridge networks various forms of hybrid coil networks may be used. Furthermore, many other variations will readily present themselves to those skilled in the art.

While I have described above the principles of my invention in connection with specific apparatus, it is to be clearly understood that this description is made only by way of example and not as a limitation to the scope of my invention.

What I claim is:

1. An indicating system for indicating the position of a craft at a relatively fixed station in response to electrical pulses received from said craft at spaced points at said relatively fixed station, comprising a pair of spaced receiving antennas, a translator means for deriving from said received pulses at each antenna, wave energies of a frequency such that a half wave thereof is at least equal to said antenna spacing and phased with respect to each other dependent upon the time of reception of said antennas, combining means comprising means for deriving waves equal to a vector sum and a vector difference of the wave energy from said translator means and a phase shifter for one of the combined derived waves to produce a ninety degree phase shift thereof, to derive different waves therefrom, means for differently modulating said different waves and means responsive to said different modulated waves to produce a directive indication of the location of said craft.

2. An indicating system for indicating the position of a craft at a relatively fixed station in response to pulses of radio frequency energy from said craft received at spaced points at said relatively fixed station comprising a pair of antennas spaced apart a plurality of wavelengths at said radio frequency, means for detecting said waves to produce envelope pulses, translator means for deriving from said envelope pulses at each antenna wave energy of a frequency such that a half wave thereof is at least equal to the antenna spacing of said pair and phased with respect to one another dependent upon the time of reception of said pulses by said antennas, combining means comprising means for deriving waves equal to a vector sum and a vector difference of the wave energy from said translator means and a phase shifter for one of the combined derived waves to produce a ninety degree phase shift thereof, to derive different waves therefrom, means for modulating differently said different waves, and means responsive to said differently modulated waves to produce a directive indication of the source of said received energy.

3. An indicating system according to claim 2, wherein said means for differently modulating said waves comprises a source of first and second indicator energies of different frequencies, a carrier output modulator and a balanced modulator, means for applying said derived waves to respective ones of said modulators, means for applying said first and second indicator energies cophasally to one of said modulators and means for applying said first and second indicator energies antiphasally to the other of said modulators.

4. An indicator system according to claim 3 wherein said means responsive to said differently modulated waves, comprises a hybrid network for combining said differently modulated waves, a detector for deriving said indicator wave components from said combined waves, means for separating said components, means for rectifying said separated components and a meter to indicate direction in response to said rectified components.

References Cited in the file of this patent

UNITED STATES PATENTS

| | | |
|---|---|---|
| 2,216,708 | Kolster | Oct. 1, 1940 |
| 2,476,977 | Hansel | July 26, 1949 |
| 2,479,892 | Aicardi | Aug. 23, 1949 |
| 2,495,718 | Hardy | Jan. 31, 1950 |
| 2,514,351 | Smith | July 4, 1950 |
| 2,528,141 | Hastings | Oct. 31, 1950 |

FOREIGN PATENTS

| | | |
|---|---|---|
| 586,278 | Great Britain | Mar. 13, 1947 |